(12) United States Patent
Sambandam

(10) Patent No.: US 10,574,540 B2
(45) Date of Patent: Feb. 25, 2020

(54) METHOD AND SYSTEM FOR FACILITATING MANAGEMENT OF SERVICE AGREEMENTS FOR CONSUMER CLARITY OVER MULTIPLE CHANNELS

(71) Applicant: Anand Sambandam, Newark, DE (US)

(72) Inventor: Anand Sambandam, Newark, DE (US)

( * ) Notice: Subject to any disclaimer, the term of this patent is extended or adjusted under 35 U.S.C. 154(b) by 58 days.

(21) Appl. No.: 15/707,905

(22) Filed: Sep. 18, 2017

(65) Prior Publication Data

US 2018/0083843 A1 Mar. 22, 2018

Related U.S. Application Data

(60) Provisional application No. 62/396,097, filed on Sep. 17, 2016.

(51) Int. Cl.
*H04L 12/24* (2006.01)
*G06F 21/57* (2013.01)
*H04W 8/18* (2009.01)

(52) U.S. Cl.
CPC ........ *H04L 41/5009* (2013.01); *G06F 21/577* (2013.01); *H04L 41/06* (2013.01); *H04L 41/5032* (2013.01); *H04W 8/18* (2013.01)

(58) Field of Classification Search
CPC ... G06Q 50/265; H04L 41/06; H04L 41/5009; H04L 41/5032
See application file for complete search history.

(56) References Cited

U.S. PATENT DOCUMENTS

| | | | |
|---|---|---|---|
| 2002/0104015 A1* | 8/2002 | Barzilai | G06F 21/604 726/1 |
| 2011/0295988 A1* | 12/2011 | Le Jouan | G06F 21/31 709/223 |
| 2013/0103759 A1* | 4/2013 | Blom | H04W 4/21 709/204 |
| 2013/0173337 A1* | 7/2013 | Evans | G06Q 30/0201 705/7.29 |
| 2013/0318199 A1* | 11/2013 | Le Jouan | H04L 67/02 709/217 |
| 2013/0340036 A1* | 12/2013 | Furukawa | H04L 63/20 726/1 |
| 2016/0182607 A1* | 6/2016 | Pan | H04L 67/06 709/217 |
| 2017/0070539 A1* | 3/2017 | Sachs | G06F 16/22 |
| 2017/0083931 A1* | 3/2017 | Allinson | G06Q 30/0224 |

(Continued)

*Primary Examiner* — Shean Tokuta

(57) ABSTRACT

Disclosed is a method for facilitating management of at least one service agreement associated with a user and at least one service provider. The method may include receiving, using a communication device, a service agreement from a service provider system. Further, the method may include performing, using a processing device, one or more of analyzing the service agreement, identifying at least one collectable data associated with the user account and identifying at least one action associated with the at least one collectable data. Further, the method may include storing, using a storage device, each of the at least one collectable data and the at least one action in association with the service agreement. Further, the method may include transmitting, using the communication device, each of the at least one collectable data and the at least one action to a user device associated with the user account.

14 Claims, 12 Drawing Sheets

(56) References Cited

U.S. PATENT DOCUMENTS

2017/0193624 A1* 7/2017 Tsai ................. G06Q 50/265
2017/0249478 A1* 8/2017 Lovin ............... G06F 21/6245
2018/0005276 A1* 1/2018 John ................ G06Q 30/0269

* cited by examiner

METHOD AND SYSTEM FOR FACILITATING MANAGEMENT OF SERVICE AGREEMENTS FOR CONSUMER CLARITY OVER MULTIPLE CHANNELS

FIELD OF THE INVENTION

The present invention relates to information security. In particular, the present invention relates to techniques for facilitating management of service agreements.

BACKGROUND OF THE INVENTION

Technology has evolved at a rapid pace resulting in smart phones, mobile applications, social media, wearable devices, and Internet of Things (IoT) devices flooding the market. Most of these devices include a set of powerful features for data collection and tracking. Consumers interact with hundreds of brands or companies and mobile applications each year. Examples of data collected include persistent device identifiers, workout routines, eating habits, length of exercise, medical search histories, zip code, gender, and geo-location, exact location tracking, real-time location tracking, sleep patterns, utility usage, driving habits, SSN, date of birth, search patterns, and website clicks. Each of these entities manages the personal data that best fits their needs leaving the consumer out in the dark. Often, consumers are not given proper notice with clarity, which may enable them to understand the data being collected. The ability of consumers to understand what personal information is being collected and shared by companies has serious limitations. Further, the collected data is often shared with one or more of third parties, vendors, technology service providers, advertising platforms, outsourcing companies, offshore companies and others without proper consent from the consumer.

In other words, the consumers have no central place to visit and understand what information various companies are collecting and what they are doing with the collected information. Further, the consumers have no central platform to retrieve the privacy practices of the brands they interact with. Yet further, the consumers have no way to set their privacy preferences for all their brands in one place.

Moreover, the companies are limited in their ability to manage data privacy risk resulting from persistent data collection from multiple sources, lack of explicit user consent, and massive growth in big data. The problem has grown to unmanageable proportions for both companies and consumers.

Accordingly, there is a need for methods and systems for facilitating management of service agreements in an efficient manner, which allows the customers to understand the personal data being collected and shared by various companies and/or for companies to better manage service agreements and data privacy risks across multiple channels.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed is a method for facilitating management of one or more service agreements associated with a user and one or more service providers. The method may include receiving, using a communication device, a service agreement from a service provider system. Further, the method may include analyzing, using a processing device, the service agreement. Further, the method may include identifying, using the processing device, at least one collectable data associated with the user account based on the analyzing. Further, the method may include identifying, using the processing device, one or more actions associated with the at least one collectable data based on the analyzing. Further, the method may include storing, using a storage device, each of the at least one collectable data and the one or more actions in association with the service agreement. Further, the method may include transmitting, using the communication device, each of the at least one collectable data and the one or more actions to a user device associated with the user account.

According to further aspects, a system for facilitating management of one or more service agreements associated with a user account and one or more service providers is provided. The system may include a communication device configured for receiving a service agreement from a service provider system and transmitting each of at least one collectable data and one or more actions to a user device associated with the user account. Further, the system may include a processing device configured for analyzing the service agreement, identifying the at least one collectable data associated with the user account based on the analyzing and identifying the one or more actions associated with the at least one collectable data based on the analyzing. Additionally, the system may include a storage device configured for storing each of the at least one collectable data and the one or more actions in association with the service agreement.

According to some aspects, privacy policies of companies including websites, mobile applications, web applications, cloud applications and IoT devices are assessed and simplified for clarity, such that consumers are able to understand what personal data is being collected and shared. Further, the customers are allowed to set their preferences accordingly for multiple channels and brands in a central place, using a centralized data processing system and software algorithms that may be accessed via the Internet. The centralized data processing system and software algorithms may have the capability to store, process information pertaining to privacy practices of companies.

The present disclosure provides techniques that may be used in many industries where there is a need for data privacy and where technology is collecting data automatically. The disclosed techniques may apply to wide range of areas, where there is a need for an input from either the business or the consumer. For example, field labels and data capture elements may be changed to capture information and privacy preference regarding a particular event type or a channel type in the future and such information may become available to the business on an "on-demand" basis. Also, parents may connect with school systems and understand the privacy of their kids.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
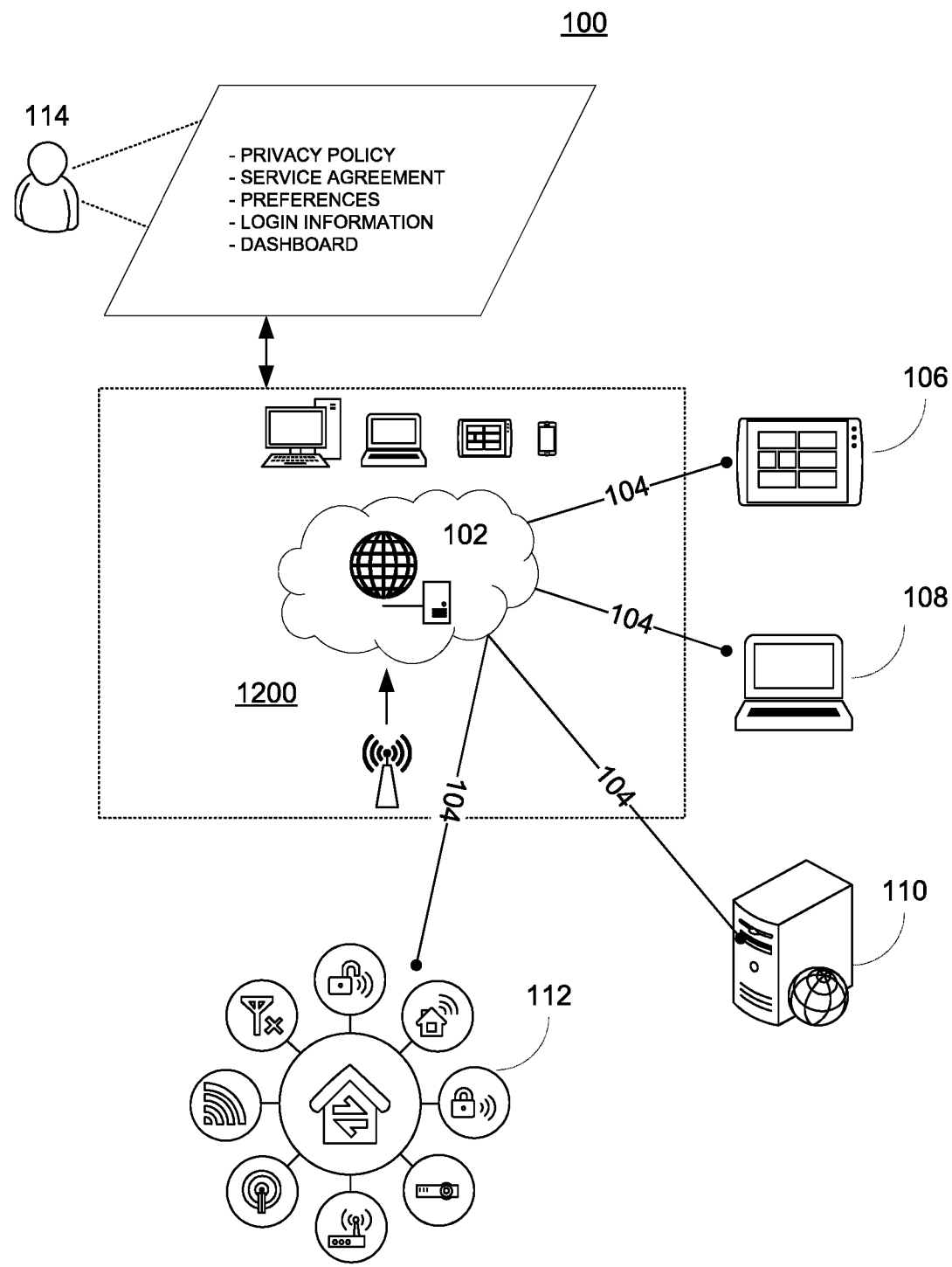
FIG. 1 illustrates an exemplary environment in which embodiments of the present disclosure may be implemented.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list." The following detailed description refers to the accompanying drawings.

Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of gaming machines, embodiments of the present disclosure are not limited to use only in this context.

Overview

According to some aspects, the present disclosure is a platform that may be accessible by both companies and consumers remotely and allowing them to collaborate with each other regarding privacy choices. The platform may virtually eliminate the confusion for consumers encountering complicated lengthy legal policies and help them understand what information companies are collecting about them. The platform may also show consumers how their information is being collected and what channels are being used to collect information. Further, faster and "on-demand access" may also be available for both consumers and companies using APIs and web-services provided by the platform via a SaaS cloud. The platform may also empower companies to achieve better engagement for the benefit of both parties. The platform may also help companies to immediately implement incident-based responses for data breaches designed to protect the privacy of existing and new customers.

The platform may include a privacy logic controller that may orchestrate the preferences of thousands or even millions customers via the API and a private cloud, delivering the necessary results to the enterprise applications and products, which may then be used to implement on an enterprise-wide scale. The platform may also help companies implement enterprise-wide policy management capabilities across multiple channels. A central cloud-based data store may be designed to collect and store preference data in its secure repository, which includes triggers and algorithms for data integrity and may be configured to execute SQL queries that would return fast results based on indexed entries.

The cloud platform with necessary web applications may be accessible by both consumers and businesses via HTTP or HTTPS protocol using the Internet. Further, a customized user interface based on the user role, as it is originally registered in the Platform, may be provided. Yet further, a customized list of menu options based on the user role may be provided. Further, a mechanism to validate new users through verification emails is provided. Yet further, a mechanism is provided to accept payments from the users whom are required to pay for using the services of the platform. A registration module may allow users to select a user name and password for accessing the platform. Further, a customized user interface is provided for the businesses where they can manage user preferences and export them to other applications or to a file. Similarly, a customized user interface is provided where businesses may add third party vendors and manage data sharing rules. Yet further, a customized user interface and logic controller are provided where businesses may add software providers and manage data sharing rules. Similarly, a customized user interface and logic controller are provided where businesses can add multiple channels and manage data sharing rules at a granular level per channel. Moreover, a customized user interface and data store with logic controller are provided where consumers and businesses may access simplified privacy policies. The platform may employ a double-verification process where customer preference may be verified by both parties at their respective interfaces using algorithms. Further, a specially formulated intuitive interface is provided that queries user to determine the initial set of brands a user uses in her life to build a privacy risk profile and store the same in a database that is tied to a modular "data type-based layout" portal. Further, a system code is provided to add, update and delete preference items by the customers and assign them to a specific company or third party, with the ability to view status. The platform may also include a notification management system to manage effective communication between involved parties. Further, the platform may include a dispute resolution system with the system code to manage privacy disputes arising between involved parties. The privacy logic controller orchestrates the customer preferences data flow to enterprise applications and products via the REST web services API Call from a private cloud. A data integrity checker may be provided to analyze and maintain the preference integrity. A Time-Gap bridging component may display tabular format data for customers. A location tracker analyzer may display all the brands and applications that track the location of a user using GPS. The platform may also include a sensitive information analyzer that displays all the brands and applications that collect the sensitive information of a user such as SSN, DOB and driver's license number. Similarly, a health information analyzer may display all the brands and applications that collect the health information of a user. The platform may provide a customized dashboard interface where users may see the alerts and risks based on the brands they use and based on the recent data breach events. An aggregate risk profiler on the consumer dashboard may display the risk profile for each type of "data category" based on the brands and the type of information collected and shared. The platform may also include system Administration modules to administer all the users and their privileges. An event-based responder module may direct the APIs to stop collecting personally identifiable data in the event of a data breach. The platform may also provide a user interface to turn off data collection across all applications, products and services for a business.

Referring now to figures, FIG. 1 is an illustration of a platform consistent with various embodiments of the present disclosure. By way of non-limiting example, the online platform 100 for facilitating management of one or more service agreements associated with a user and one or more service providers, may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 108 (such as, a desktop computer, etc.), servers 110 and IoT devices 112 over a communication network 104, such as, but not limited to, the Internet. Further, users of the platform may include one or more relevant parties such as individuals, business owners, and administrators. Accordingly, electronic devices operated by the one or more relevant parties may be in communication with the platform 100.

A user 114, such as the one or more relevant parties, may access platform 100 through a software application. The software application may be embodied as, for example, but not be limited to, a website, a web application, a desktop application, a mobile application and a gaming machine application compatible with a computing device 1200. The computing device 1200 is explained in further detail in conjunction with FIG. 12 below.

Figure 2:
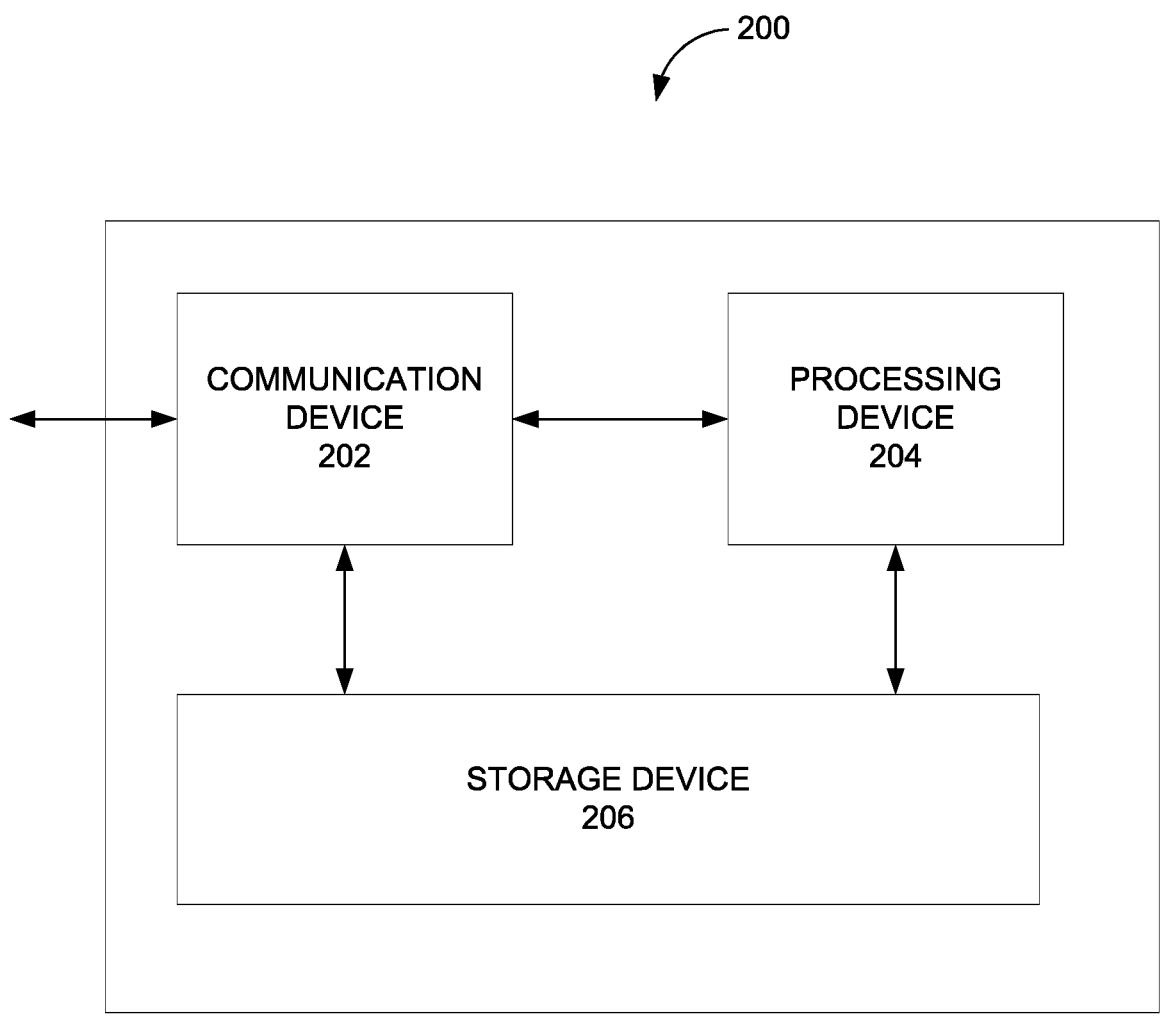
FIG. 2 is a block diagram of a system for facilitating management of a service agreement, in accordance with some embodiments.

FIG. 2 is a block diagram of a system 200 for facilitating management of one or more service agreements, in accordance with some embodiments. For example, the one or more service agreements may include, but are not limited to, one or more of a privacy policy, a lease agreement, notice of terms and conditions, a disclosure notice, and a license agreement. The one or more service agreements may be associated with a user and one or more service providers. For example, the service provider may provide one or more of a product and a service to the user account. Further, the service agreement may govern provisioning of one or more of the product and the service.

The system 200 may include a communication device 202 configured for receiving a service agreement from a service provider system. In some embodiments, the communication device 202 may be configured to automatically perform crawling to receive a service agreement from a public-facing website of the service provider. Further, the communication device 202 may be configured for transmitting each of at least one collectable data and one or more actions to a user device associated with the user account. Accordingly, in some embodiments, a simplified view of the service agreement may be provided to the user. The simplified view makes it easy for the user to understand complex legal phrases and terms outlined in the service agreement. For example, the simplified view may include a listing of types of collectable data such as, email, phone number, SSN, home address, etc. Further, the simplified view may also include a listing of identities of third-parties with whom the collectable data is shared in accordance with the service agreement.

In general, the collectable data may include any data associated with the user account and/or a user corresponding to the user account. Further, the collectable data may be collected from any source. For example, the collectable data may be obtained from one or more user devices operated by the user. As another example, the collectable data may be retrieved from third party databases storing data associated with the user account and/or the user.

Furthermore, the at least one collectable data may include one or more of an indication of a collectable data and an instance of the collectable data. For example, the indication of a collectable data may represent a type of collectable data, such as, for example, email, phone number, residential address, geographical location and so on. Accordingly, an instance of a collectable data may represent a value of the collectable data, for example, anonymous@serviceprovider.com, 123-555-456, and so on.

Further, in some embodiments, the at least one collectable data may include one or more of personally identifiable data and anonymous data. Further, the at least one collectable data may include contact information associated with the user account. Yet further, the at least one collectable data may include behavioral data associated with the user device. Moreover, the at least one collectable data may include one or more of personal data, health data, financial data and professional data. Further, the at least one collectable data may include location data associated with one or more user devices associated with the user account. Yet further, the at least one collectable data may include user interactions performed on the user device. Moreover, the at least one collectable data may be associated with one or more user devices associated with the user account. Further, the at least one collectable data may be collectable from a service provider device. Yet further, the at least one collectable data may be collectable from a public device.

Further, the one or more actions may include one or more of collecting of the collectable data, storing of the collectable data and sharing of the collectable data with one or more third parties. Further, in some embodiments, the one or more actions may be associated with one or more conditions under which the one or more actions are performable. Accordingly, the one or more conditions may set a context within which the one or more actions are performable. For example, location information of a user device associated with the user account may be collectable only within certain predetermined geographies (e.g. area, city, state etc.). As another example, the one or more conditions may specify identities of one or more third parties with whom a collectable data may be shared.

Yet further, the system 200 may include a processing device 204 configured for analyzing the service agreement, identifying the at least one collectable data associated with the user account based on the analyzing and identifying the one or more actions associated with the at least one collectable data based on the analyzing. In some embodiments, the analyzing may be based on one or more of natural language processing and machine learning.

Additionally, the system 200 may include a storage device 206 configured for storing each of the at least one collectable data and the one or more actions in association with the service agreement. For example, in an instance, the storage device 206 may be configured to store indications (i.e. type) of collectable data, such as, email, phone number, and so on. Accordingly, actual data corresponding to the user account may not be stored. Alternatively, in another instance, the storage device 206 may also be configured to store values of the collectable data.

In some embodiments, the communication device 202 may be further configured for receiving an indication of the service provider system from the user device, transmitting a request to the service provider system and receiving a response from the service provider system. Further, the response may include the service agreement. Accordingly, in an instance, the system may be configured to perform web-crawling and/or web-scraping on the service provider system in order to retrieve the service agreement. Alternatively, and/or additionally, in some instances, the system may be configured to retrieve the service agreement from the service provider system through a predefined API.

In further embodiments, the communication device 202 may be further configured for receiving browser data from the user device, analyzing the browser data and identifying each of the service agreement indicator and a brand identifier based on the analysis of the browser data. Further, the indication of the service provider may include the brand identifier and the service agreement indicator.

In some embodiments, the processing device 204 may be further configured for determining a privacy risk score associated with the service agreement based on the analyzing of the service agreement. Further, the processing device 204 may be configured for comparing the privacy risk score to a predetermined threshold. The communication device 202 may be further configured for transmitting an alert to the user device based on a result of the comparing.

In some embodiments, the processing device 204 may be further configured for generating a preferences interface associated with the service agreement. Further, the preferences interface may include one or more parameters corresponding to the at least one collectable data. Further, one or more values corresponding to the one or more parameters determines the one or more actions performable on the at least one collectable data. Further, the communication device 202 may be configured for transmitting the preferences interface to the user device, receiving the one or more values corresponding to the one or more parameters from the user device and transmitting the one or more values to the service provider system. Accordingly, the user may specify the data that may be collected and/or shared through the one or more parameters. Further, the user may also specify one or more identities of third parties with whom the collectable data may be shared. Additionally, the one or more parameters may specify the one or more conditions associated with the at least one collectable data.

In some embodiments, the processing device 204 may be further configured for determining one or more of a privacy risk score and a restriction score associated with the service agreement based on the analyzing of the service agreement. In further embodiments, the processing device 204 may be configured for identifying at least one sensitive data in the at least one collectable data, identifying one or more sensitive actions in the one or more actions and determining the privacy risk score based on one or more of the at least one sensitive data and the one or more sensitive actions.

In some embodiments, the restriction score may be based on at least one optionality associated with the one or more actions. Further, an optionality of an action allows a user associated with the user account to opt-out of the action. In further embodiments, the system 200 may be configured for identifying, using the processing device 204, at least one optionality associated with the at least one collectable data and the one or more actions. Further, an optionality associated with a collectable data allows a user associated with the user account to forbid access to the collectable data. Further, an optionality associated with an action allows the user to forbid performance of the action. The system 200 may be further configured for determining, using the processing device 204, a count associated with the at least one optionality. Further, the restriction score may be based on the count.

In some embodiments, the communication device 202 may be further configured for receiving collected data from one or more of the user device and the service provider system. Further, the communication device 202 may be configured for transmitting a breach-alert to at least one of the user device and the service provider system based on determining a breach. Further, the processing device 204 may be configured for comparing the collected data with the at least one collectable data and determining the breach of the service agreement based on the comparing.

Figure 3:
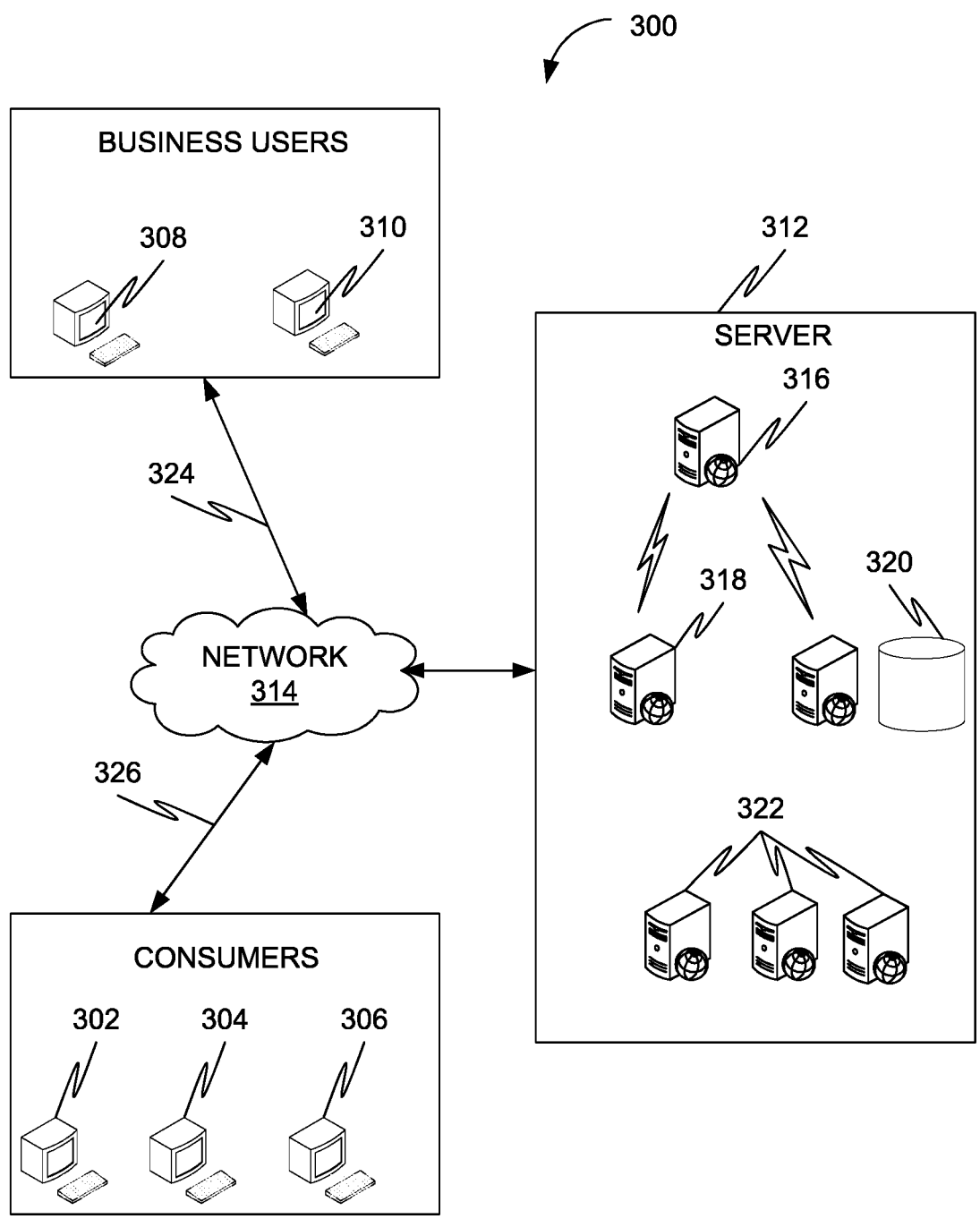
FIG. 3 is a block diagram of a system for facilitating management of a service agreement, in accordance with an exemplary embodiment.

FIG. 3 is a block diagram of a system 300 for facilitating management of a service agreement, in accordance with an exemplary embodiment. Consumers 302-306 and business users 308-310 may use their electronic device, such as computers or mobile devices or tablets, to connect to a server 312 via a network 314. The consumers 302-306 may be located in multiple locations. The network 314 may be the Internet or an Intranet.

The server 312 may include an application server 316, a secure gateway 318, an SQL database 320 and load balancing servers 322. The application server 316 may provide a web application as its front-end. The application may be developed using one or more of HTML, JavaScript, CSS, Python, MYSQL, PERL, Java, C++, and PHP. The application may provide a login screen to validate user credentials prior to allowing entry through the secure gateway 318. Further, a sub-domain based routing module may re-direct the business users 308-310 to their private cloud.

The consumers 302-306 and the business users 308-310 send HTTP requests 324-326 to access the server 312.

The server 312 may include one or more modules such as a registrations module, and an entry module. The registration modules registers users and sets varying access levels for the users based on their roles. Further, a custom UI with corresponding navigation items may be presented, based on whether the logged user is a consumer or a business. The entry module allows a user for addition of third parties and vendors, and channels by businesses, provided the user role has privileges to perform the action. Various tasks may be entered into the server 312 and retrieved by appropriate roles and based on assignments. A collaborative communication link may be maintained as long as one party revokes access.

System configuration tables in the SQL database 320 maintain data that form the core for the preference tables. The front-end application may access the backend database tables via a computer algorithm written using object-oriented programming language.

Further, records may be stored based on the user entries and retrieved based on the auto-generated SQL queries, when accessed by the front-end web application. Yet further, preference and customer entries may be sorted and stored by date and time of the entry.

The architecture of the server 312 is designed for scalable growth as more customer privacy preference and business entries accumulate. Therefore, depending on the bandwidth and storage space requirements, new servers may be added in the form of a cluster. Further, the load balancing servers 322 enable load balancing depending on server traffic.

According to some embodiments, the server 312 includes an algorithm, a system code and a database that sorts, analyzes and tabulates the privacy policies of companies.

According to some embodiments, the server 312 includes an algorithm, a system code and a database that sorts, analyzes and tabulates the privacy preferences of consumers for multiple channels.

Figure 4:
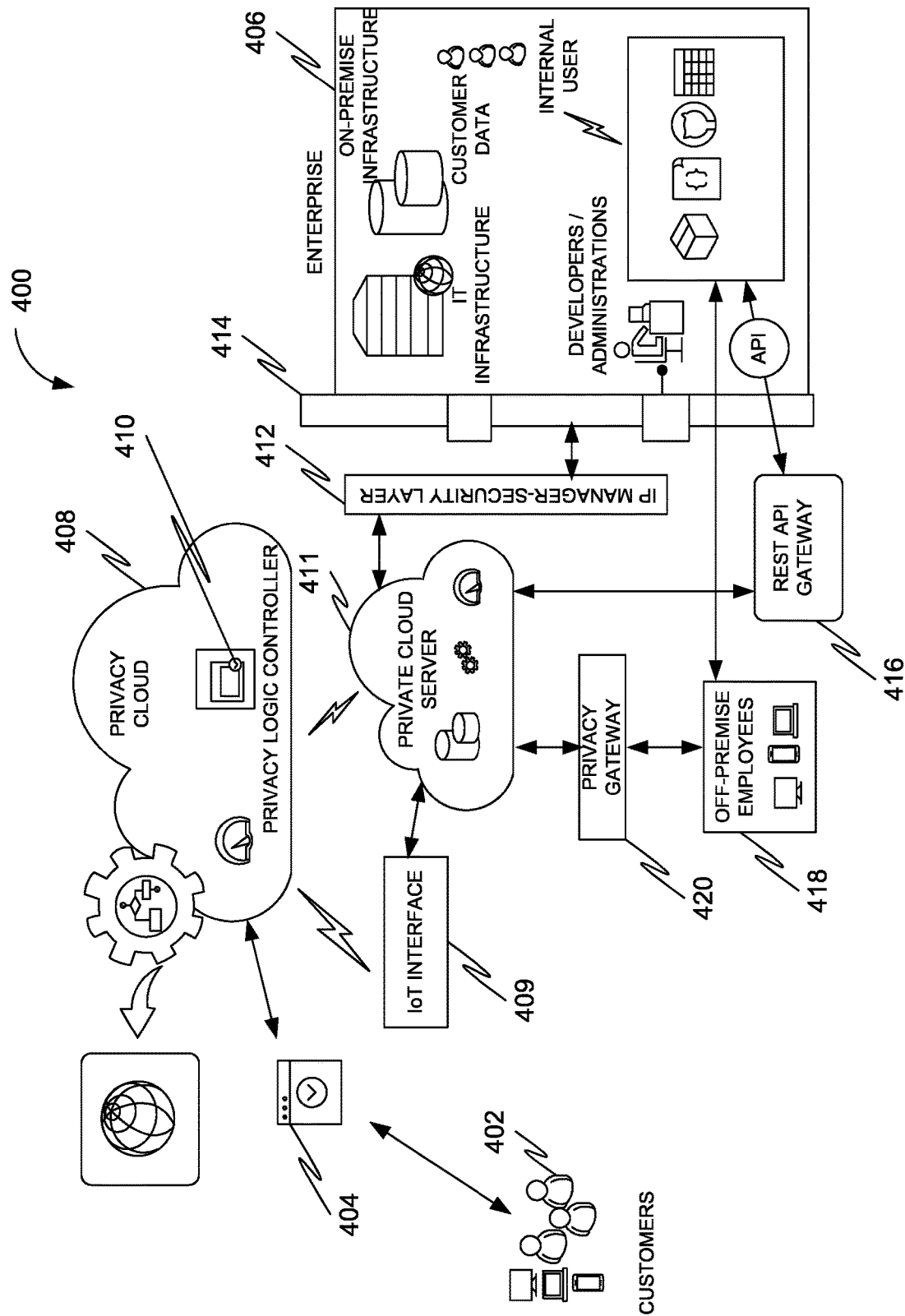
FIG. 4 is a block diagram of a system for facilitating management of a service agreement, in accordance with an exemplary embodiment.

FIG. 4 is a block diagram of a system 400 for facilitating management of a service agreement, in accordance with an exemplary embodiment. One or more customers 402 obtain simplified privacy terms 404 corresponding to privacy terms corresponding to a web service provided by an enterprise 406. The simplified privacy terms 404 may be obtained from a privacy cloud 408. The privacy cloud 408 may further provide customer dashboards to the one or more customers 402. The customer dashboards allow the one or more customers 402 to control preferences corresponding to various web services. The privacy cloud 408 may further provide a privacy portal and a brand manager. The privacy cloud 408 may also include an IoT interface 409 that allows the one or more customers 402 to connect one or more IoT devices to the privacy cloud 408. The privacy cloud 408 may further include privacy logic controller 410, which may orchestrate the preferences of customers and a private cloud sever 411, delivering the necessary results to the enterprise applications and products.

The enterprise 406 may include IT infrastructure, customer data, enterprise applications, products, developers, administrators, and other internal users. The users of the enterprise 406 may connect to the private cloud server 411 via one or more of IP manager-security layer 412, a firewall 414 and REST API gateway 416. Further, off-premise employees 418 of the enterprise 406 may connect to the private cloud server 411 via a privacy gateway 420. The private cloud server 411 provides one or more of privacy preferences database, web services, and admin dashboards.

Figure 5:
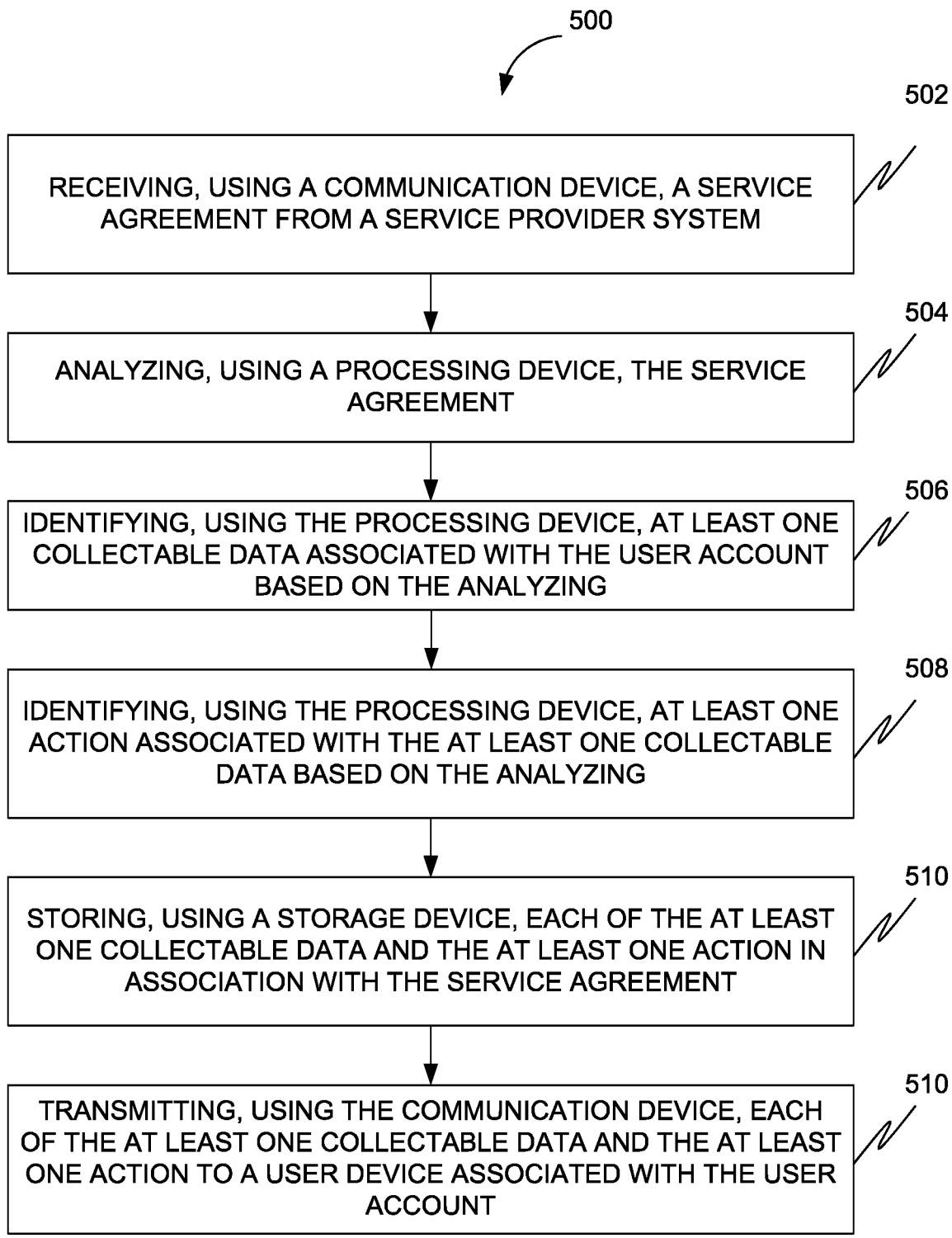
FIG. 5 illustrates a flowchart of a method for facilitating management of a service agreement, in accordance with some embodiments.

FIG. 5 illustrates a flowchart of a method 500 for facilitating management of one or more service agreements, in accordance with some embodiments. For example, the one or more service agreements may include one or more of a privacy policy, a lease agreement, and a license agreement. The one or more service agreements may be associated with a user and one or more service providers. For example, the service provider may provide one or more of a product and a service to the user account. Further, the service agreement may govern provisioning of one or more of the product and the service.

At 502, the method 500 may include receiving, using a communication device (such as the communication device 202), a service agreement from a service provider system. For example, the method 500 may include automatically crawling, using a communication device, a service agreement from a public-facing website of the service provider. In some embodiments, the service provider system provides an online service to the user account. Further, the online service may be accessible through the user device (such as the user device 106). Accordingly, the user device may include one or more of an IOT device, a smartphone, a laptop computer, a tablet computer, a desktop computer, a wearable computer, a fitness device and a medical monitoring device.

Thereafter, at 504, the method 500 may include analyzing, using a processing device (such as the processing device 204), the service agreement. Further, at 506, the method 500 may include identifying, using the processing device, at least one collectable data associated with the user account based on the analyzing (at 504). The at least one collectable data may include one or more of personally identifiable data and anonymous data. Further, the at least one collectable data may include contact information associated with the user account. Yet further, the at least one collectable data may include behavioral data associated with the user device. Moreover, the at least one collectable data may include one or more of personal data, health data, financial data and professional data. Further, the at least one collectable data may include location data associated with one or more user devices associated with the user account. Yet further, the at least one collectable data may include user interactions performed on the user device. Moreover, the at least one collectable data may be associated with one or more user devices associated with the user account. Further, the at least one collectable data may be collectable from a service provider device. Yet further, the at least one collectable data may be collectable from a public device.

In some embodiments, the method 500 may further include identifying, using the processing device, at least one sharable data associated with the user account based on the analyzing (at 504). The at least one sharable data may be comprised in the at least one collectable data. Further, the method 500 may include identifying, using the processing device, at least one "shared with" party associated with the user account based on the analyzing. The at least one "shared with" party may be a third party. Further, the method 500 may include identifying, using the processing device, one or more actions associated with the at least one sharable data based on the analyzing (at 504).

In further embodiments, the analyzing (at 504) may include performing one or both of natural language processing and machine learning based classification of the service agreement.

In further embodiments, the analyzing (at 504) may include identifying multiple acts, using the processing device. Each act in the multiple acts may include an actor, an object and an action verb based on natural language processing of the service agreement. Further, the actor may include one or more of the user, the user device, the service provider, the service provider system and a third-party. Further, the analyzing may include identifying, using the processing device, the at least one collectable data based on the object. Yet further, the analyzing may include identifying, using the processing device, the one or more actions based on the action verb.

In further embodiments, the method 500 may include training, using the processing device, a machine learning based classifier with training data comprising multiple service agreements and multiple collectable data and multiple actions associated with the multiple service agreements.

Yet further, at 508, the method 500 may include identifying, using the processing device, one or more actions associated with the at least one collectable data based on the analyzing (at 504). The one or more actions may include one or more of collecting of the collectable data, storing of the collectable data and sharing of the collectable data with one or more third parties.

Then, at 510, the method 500 may include storing, using a storage device (such as the storage device 206), each of the at least one collectable data and the one or more actions in association with the service agreement.

Yet further, at 512, the method 500 may include transmitting, using the communication device, each of the at least one collectable data and the one or more actions to a user device associated with the user account.

In further embodiments, the method 500 includes identifying, using the processing device, at least one choice associated with the at least one collectable data based on the analyzing (at 504). Further, the method 500 includes storing, using the storage device, each of the at least one action with the corresponding at least one choice in association with the service agreement. Yet further, the method 500 includes transmitting, using the communication device, each of the at least one action with the corresponding at least one choice to a user device associated with the user account.

In further embodiments, the method 500 may further include determining, using the processing device, a privacy risk score associated with the service agreement based on the analysis of the service agreement (at 504).

In further embodiments, the method 500 may include determining, using the processing device, a restriction score associated with the service agreement based on the analysis of the service agreement at 504. The restriction score may be based on at least one optionality associated with the one or more actions. An optionality of an action may allow a user associated with the user account to opt-out of the action. For example, an optionality may allow a user to opt-out of an action such as sharing of the collectable data with one or more third parties. In further embodiments, the method 500 may include identifying, using the processing device, the at least one optionality associated with the at least one collectable data and the one or more actions. An optionality associated with a collectable data allows a user associated with the user account to forbid access to the collectable data, wherein an optionality associated with an action allows the user to forbid performance of the action. In alternate embodiments, an optionality associated with an action allows the user to allow performance of the action.

Yet further, the method 500 may include determining, using the processing device, a count associated with the at least one optionality, wherein the restriction score may be based on the count.

In further embodiments, the method 500 may include generating, using the processing device, a search index based on each of the service agreement, the at least one collectable data and the one or more actions. Further, the method 500 may include receiving, using the communication device, a query from the user device. The query may include a personally identifiable datum. Yet further, the method 500 may include identifying, using the processing device, a response to the query based on the search index. The response may include one or more service providers associated with the personally identifiable datum. Moreover, the method 500 may include and transmitting, using the processing device, the response to the user device.

In further embodiments, the method 500 may include transmitting, using the communication device, each of multiple service provider indicators associated with multiple service agreements to the user device. Further, the user device may be configured to present the at least one collectable data and the one or more actions in association with the multiple service provider indicators.

In further embodiments, the method 500 may include identifying, using the processing device, one or more conditions associated with each of the at least one collectable data and the one or more actions. Further, a condition in the one or more conditions associated may stipulate performance of the one or more actions on the at least one collectable data. Further, the identifying may be based on the analysis of the service agreement.

In further embodiments, the method 500 may include identifying, using the processing device, at least one presentable data based on the analysis of the service agreement at 504. Further, the presentable data may be presented on the user device.

In further embodiments, the method 500 may include identifying, using the processing device, at least one control data based on the analysis of the service agreement at 504. Further, the control data may be configured to control one or more operations of the user device.

Figure 6:
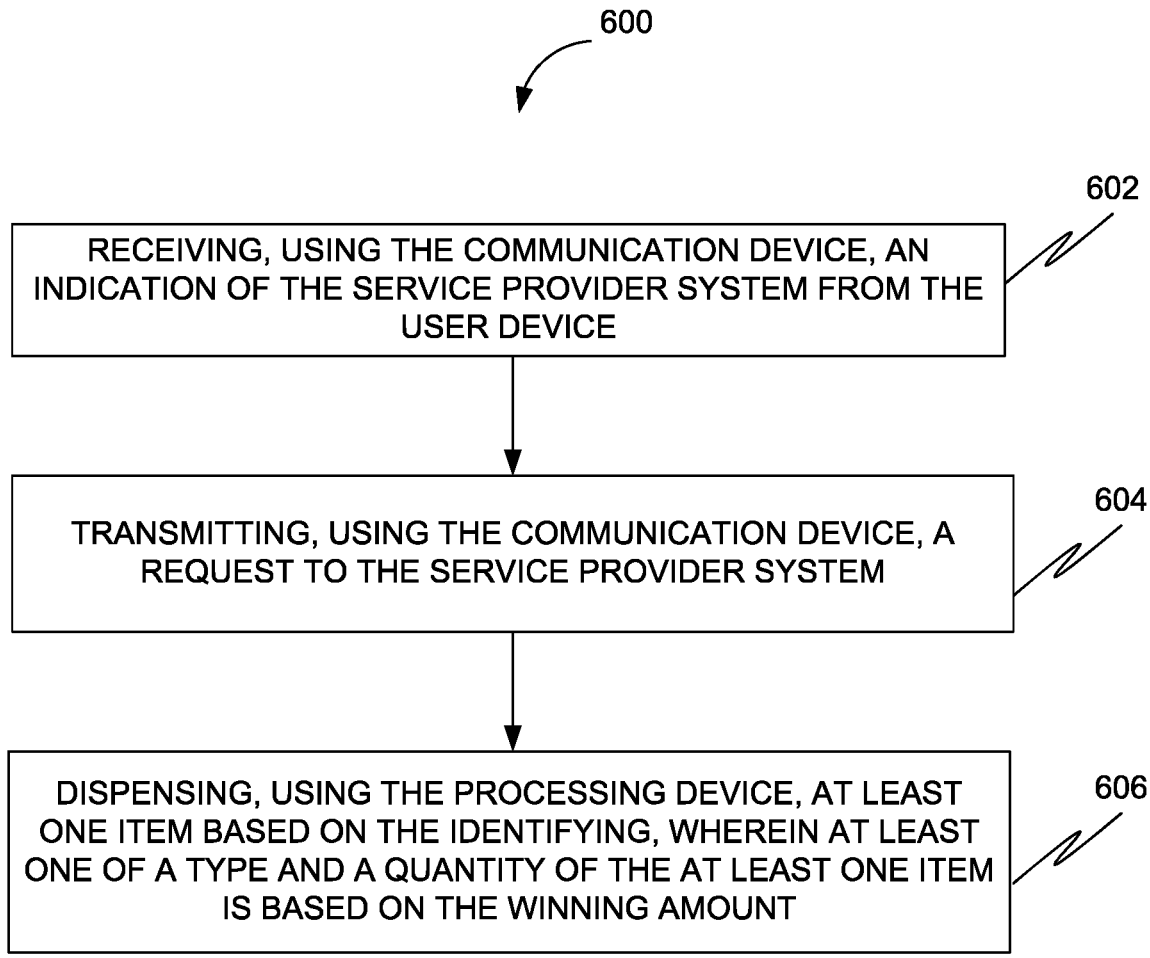
FIG. 6 illustrates a flowchart of a method for obtaining a service agreement associated with a service provider, in accordance with some embodiments.

FIG. 6 illustrates a flowchart of a method 600 for obtaining a service agreement associated with a service provider, in accordance with some embodiments. At 602, the method 602 may include receiving, using the communication device, an indication of the service provider system from the user device. For example, the indication may include one or more of a brand identifier associated with the service provider system and a URL. Further, the indication may include a service agreement indicator.

Thereafter, at 604, the method 600 may include transmitting, using the communication device, a request to the service provider system. Further, at 606, the method 600 may include receiving, using the communication device, a response from the service provider system. Further, the response may include the service agreement.

Figure 7:
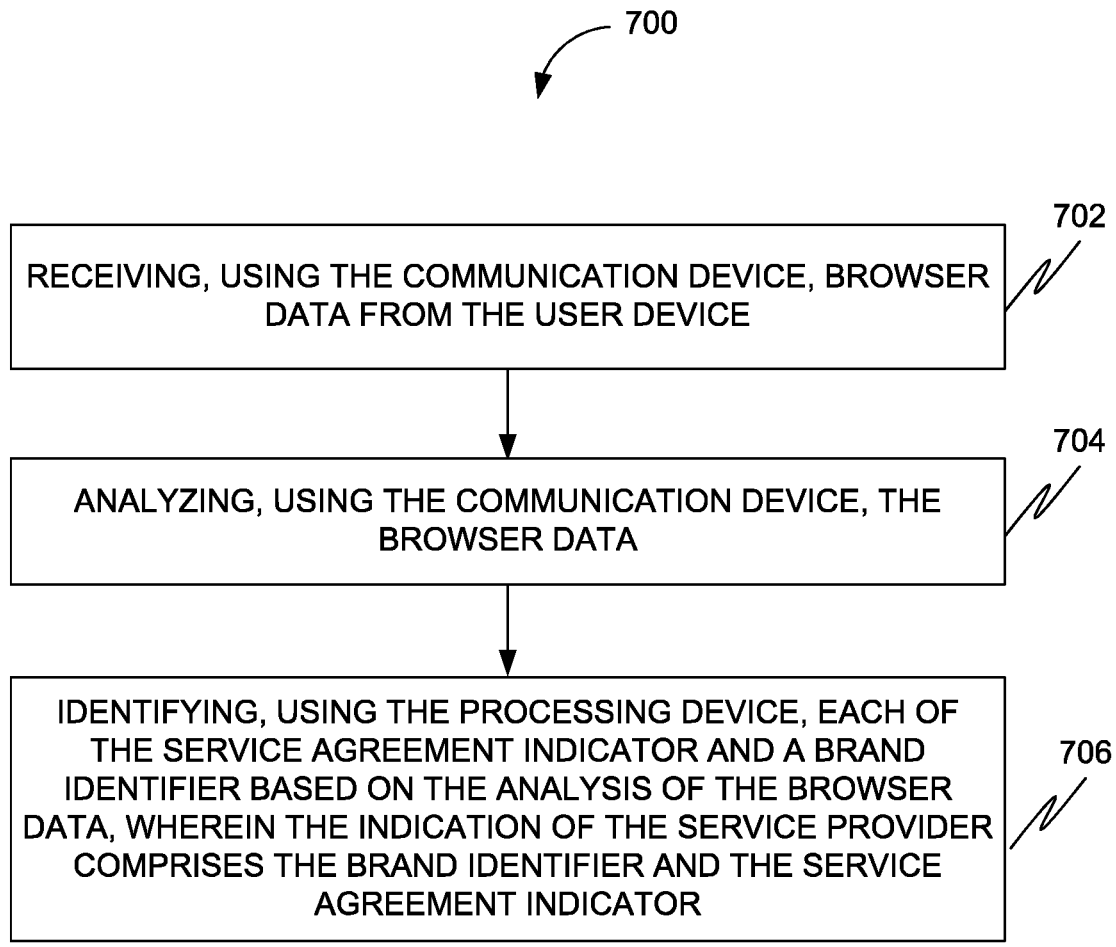
FIG. 7 illustrates a flowchart of a method for analyzing browser data, in accordance with some embodiments.

FIG. 7 illustrates a flowchart of a method 700 for analyzing browser data, in accordance with some embodiments. At 702, the method 700 may further include receiving, using the communication device, browser data from the user device. Thereafter, at 704, the method 700 may include analyzing, using the processing device, the browser data and identifying, using the processing device, each of the service agreement indicator and the brand identifier based on the analysis of the browser data at 706. For example, when a user is about to accept agreement on a webpage via a browser, the method 700 may obtain browser data from the browser, analyze the browser data, identify each of the service agreement indicator and the brand identifier and display the identified information by overlaying the information on the webpage. Similarly, the method 700 may obtain browser history (the browser data) from the browser, identify the accepted agreements by analyzing the browser history and display the at least one collectable data and the one or more actions corresponding to the accepted agreements.

Figure 8:
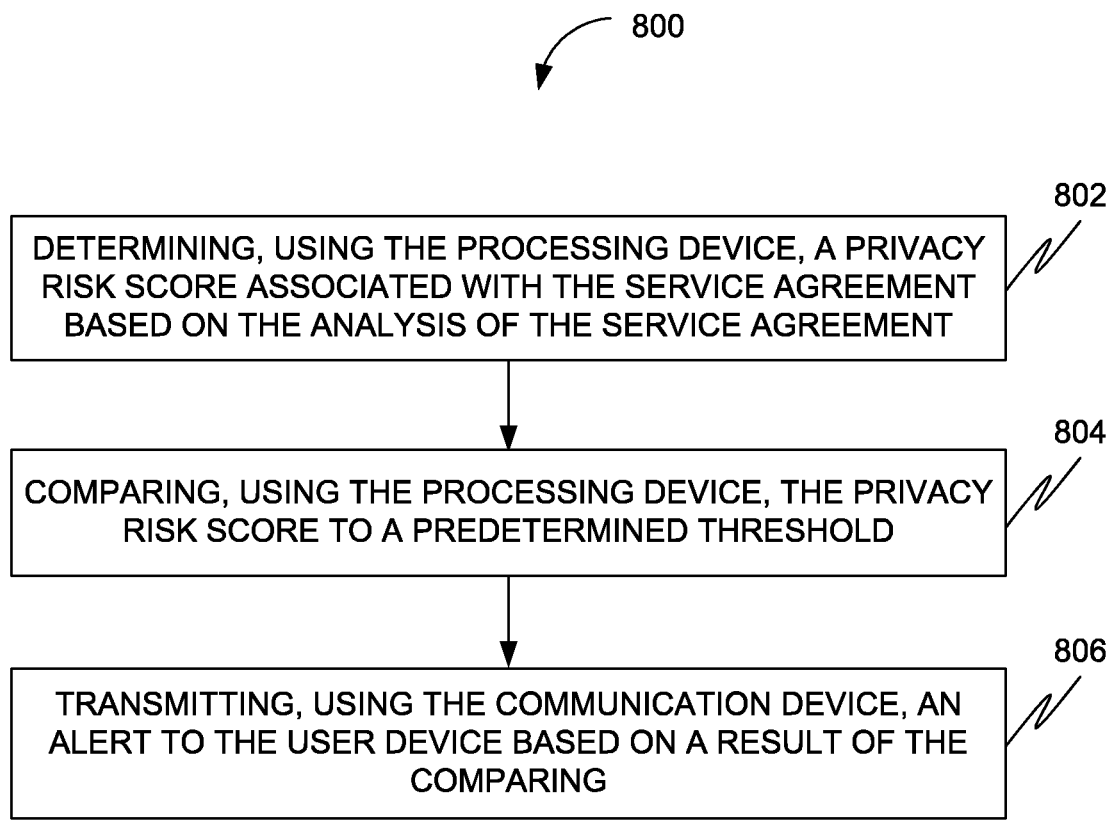
FIG. 8 illustrates a flowchart of a method for sending alerts, in accordance with some embodiments.

FIG. 8 illustrates a flowchart of a method 800 for sending alerts, in accordance with some embodiments. At 802, the method 800 may include determining, using the processing device, a privacy risk score associated with the service agreement based on the analysis of the service agreement. Then, at 804, the method 800 may include comparing, using the processing device, the privacy risk score to a predetermined threshold. Thereafter, at 806, the method 800 may include transmitting, using the communication device, an alert to the user device based on a result of the comparing at 804.

Figure 9:
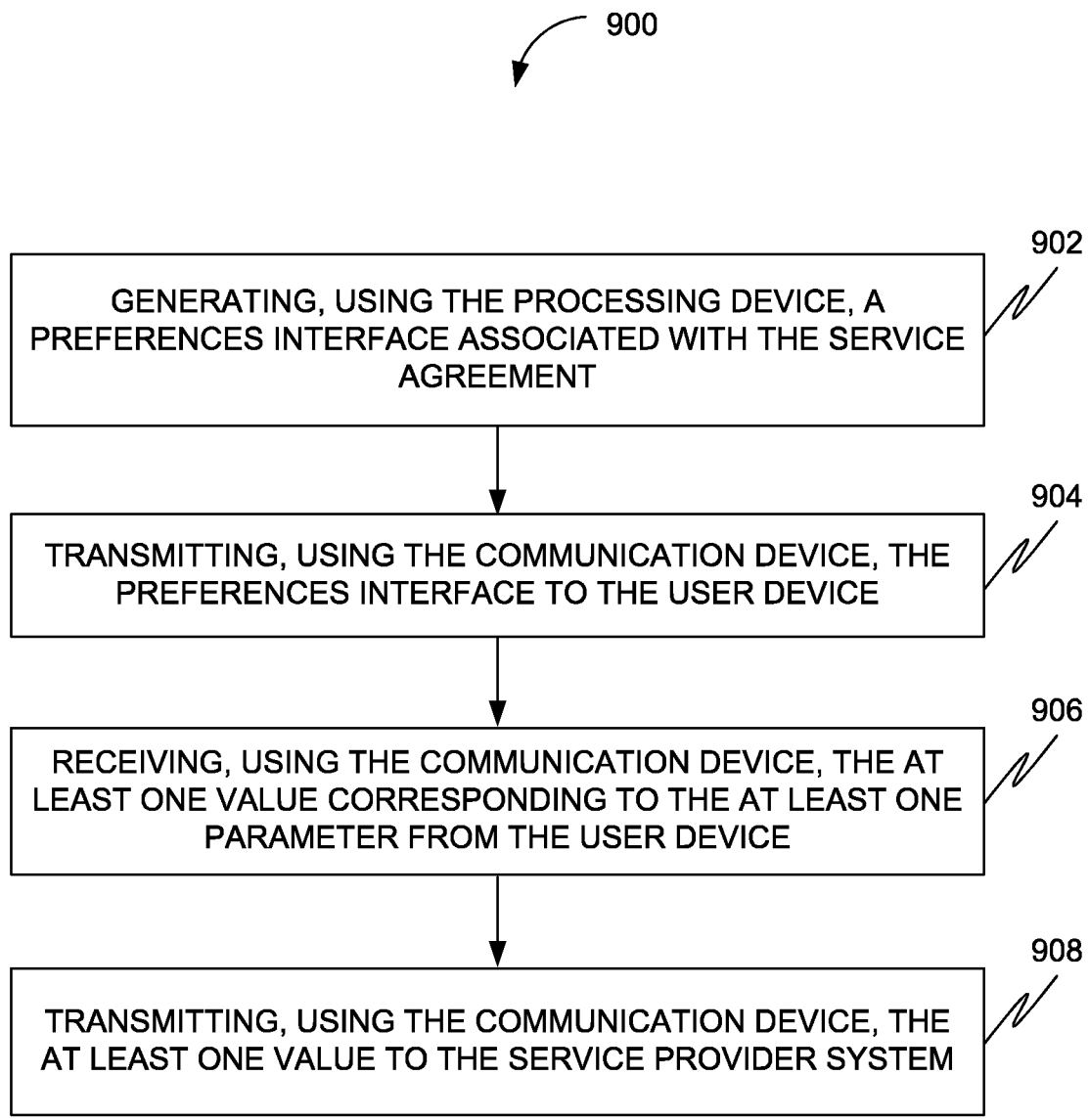
FIG. 9 illustrates a flowchart of a method for sharing user preferences with a service provider system, in accordance with some embodiments.

FIG. 9 illustrates a flowchart of a method 900 for sharing user preferences with the service provider system, in accordance with some embodiments. At 902, the method 900 may further include generating, using the processing device, a preferences interface associated with the service agreement. The preferences interface may include one or more parameters corresponding to the at least one collectable data. Further, one or more values corresponding to the one or more parameters may determine the one or more actions performable on the at least one collectable data.

In further embodiments, the method 900 includes generating, using the processing device, a preferences interface associated with the service agreement, wherein the preferences interface comprises one or more parameters corresponding to the at least one sharable data, wherein one or more values corresponding to the one or more parameters determines one or more actions performable on the at least one sharable data.

Next, at 904, the method 900 may include transmitting, using the communication device, the preferences interface to the user device. Then, at 906, the method 900 may include receiving, using the communication device, the one or more values corresponding to the one or more parameters from the user device. Thereafter, at 908, the method 900 may include transmitting, using the communication device, the one or more values to the service provider system.

In alternate embodiments, the method 900 may include transmitting, using the user device, the one or more values corresponding to the one or more parameters to the service provider system.

Figure 10:
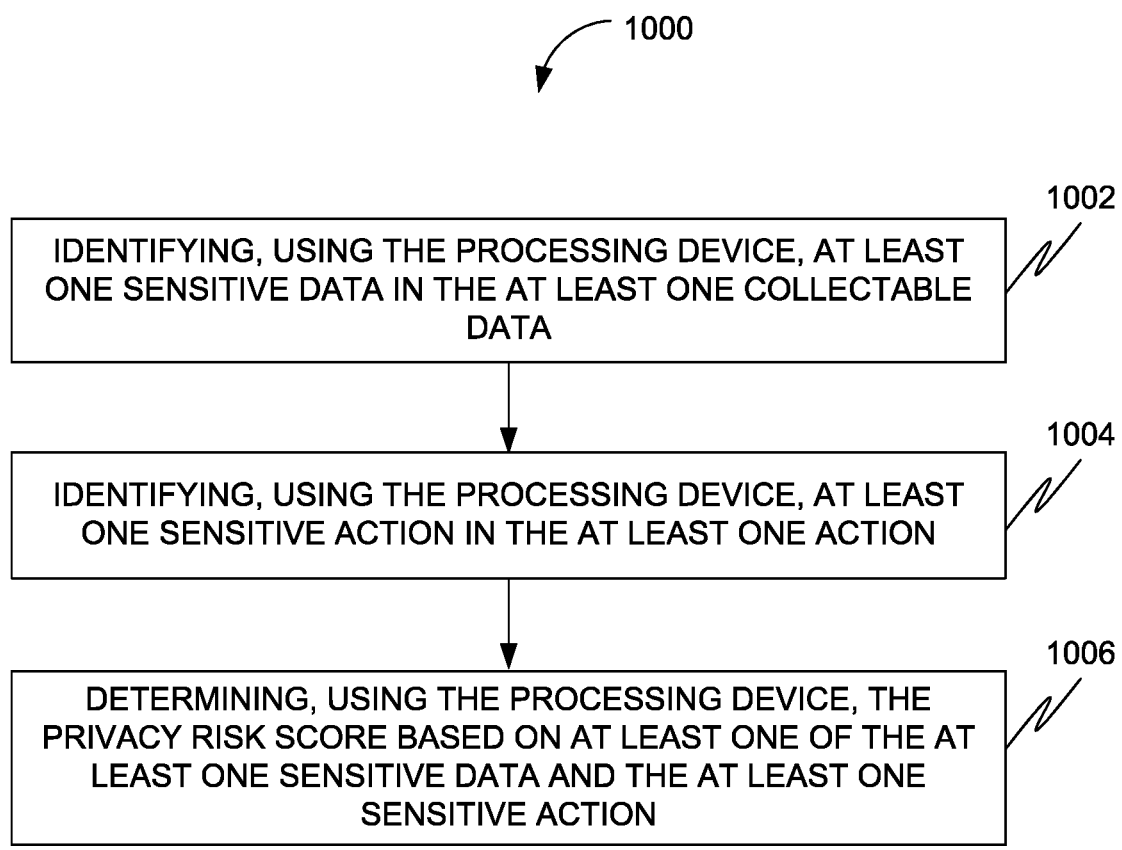
FIG. 10 illustrates a flowchart of a method for managing sensitive data with the service provider system, in accordance with some embodiments.

FIG. 10 illustrates a flowchart of a method 1000 for managing sensitive data with the service provider system, in accordance with some embodiments. At 1002, the method 1000 may include identifying, using the processing device, at least one sensitive data in the at least one collectable data. For example, the at least one sensitive data may include phone number, physical address of the user and medical data. Further, at 1004, the method 1000 may include identifying, using the processing device, one or more sensitive actions in the one or more actions. For example, the one or more sensitive actions may include sharing data with third parties. Moreover, at 1006, the method 1000 may include determining, using the processing device, the privacy risk score based on one or more of the at least one sensitive data and the one or more sensitive actions.

Figure 11:
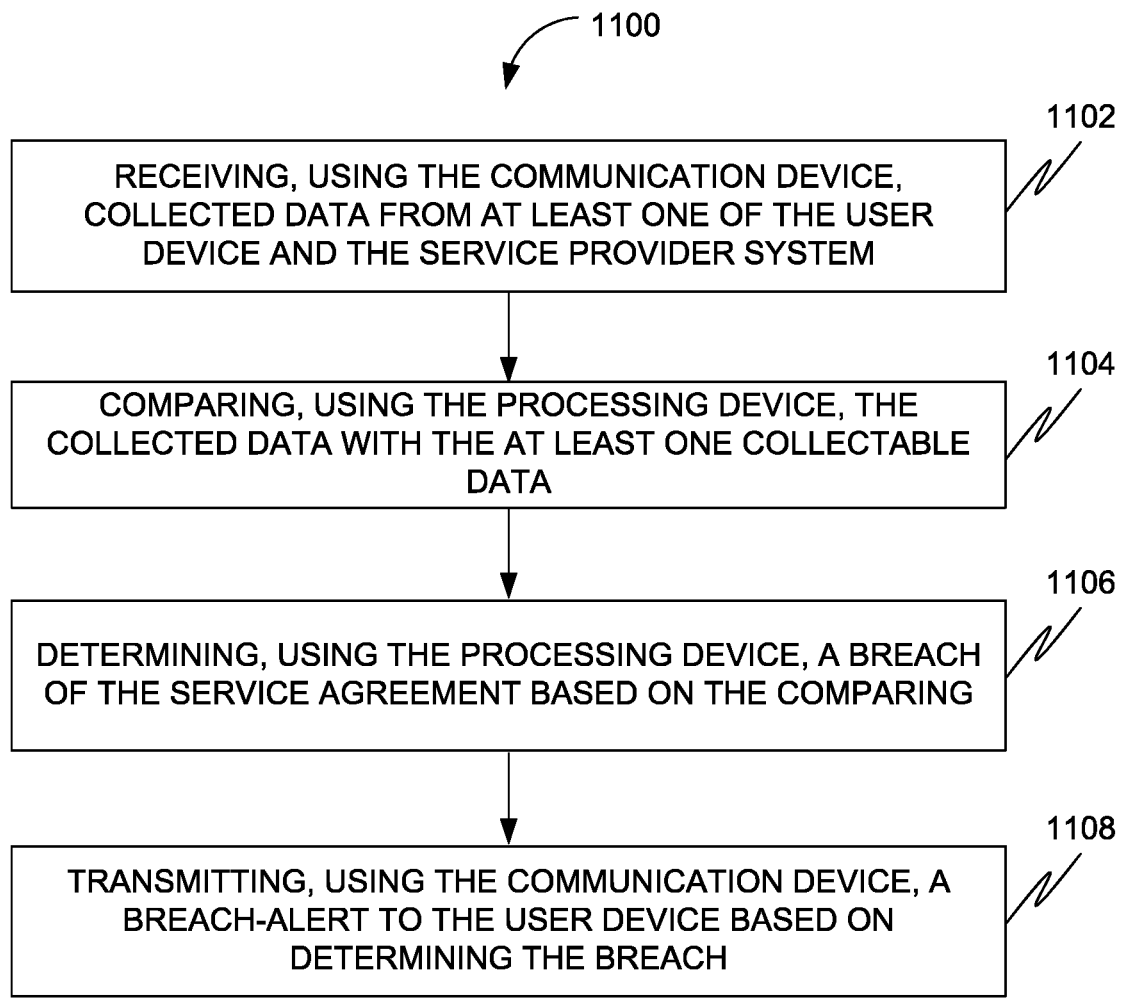
FIG. 11 illustrates a flowchart of a method for handling data breach, in accordance with some embodiments.

FIG. 11 illustrates a flowchart of a method 1100 for handling data breach, in accordance with some embodiments. At 1102, the method 1100 may include receiving, using the communication device, collected data from one or more of the user device and the service provider system. Then, at 1104, the method 1100 may include comparing, using the processing device, the collected data with the at least one collectable data. Next, at 1106, the method 1100 may include determining, using the processing device, a breach of the service agreement based on the comparing. Thereafter, at 1108, the method 1100 may include transmitting, using the communication device, a breach-alert to at least one of the user device and the service provider system based on determining the breach. In further embodiments, the method 1100 may include automatically opting-out of the service agreement based on determining the breach.

In further embodiments, the method 1100 may include analyzing, using the processing device, the sharable data details from at least one of the user device and the service provider system. Further, the method 1100 may include comparing, using the processing device, the sharable data details with the at least one sharable data. Yet further, the method 1100 may include analyzing, using the processing device, the service provider system and its associated public facing websites to determine actual collected and shared data. Thereafter, the method 1100 may include determining, using the processing device, a breach of the service agreement based on the comparing and analyzing. Further, the method 1100 may include transmitting, using the communication device, a breach-alert to at least one of the user device and the service provider system based on determining the breach.

Further, in some embodiments, the method 1100 may include steps to monitor a breach database and accordingly transmit a breach-alert to one or more of the user device and the service provider system. Accordingly, the method 1100 may include a step of comparing, using the processing device, at least one of the collectable data (e.g. values corresponding to email address, phone number, etc.) and a brand identifier associated with the service provider (e.g. service name). Further, the method 1100 may include a step of identifying, using the processing device, a breach-event associated with at least one of the service provider and the user account based on the comparing. Accordingly, the method 1100 may include a step of transmitting, using the communication device, the breach-alert to one or more of the user device and the service provider system based on the identifying of the breach-event.

Figure 12:
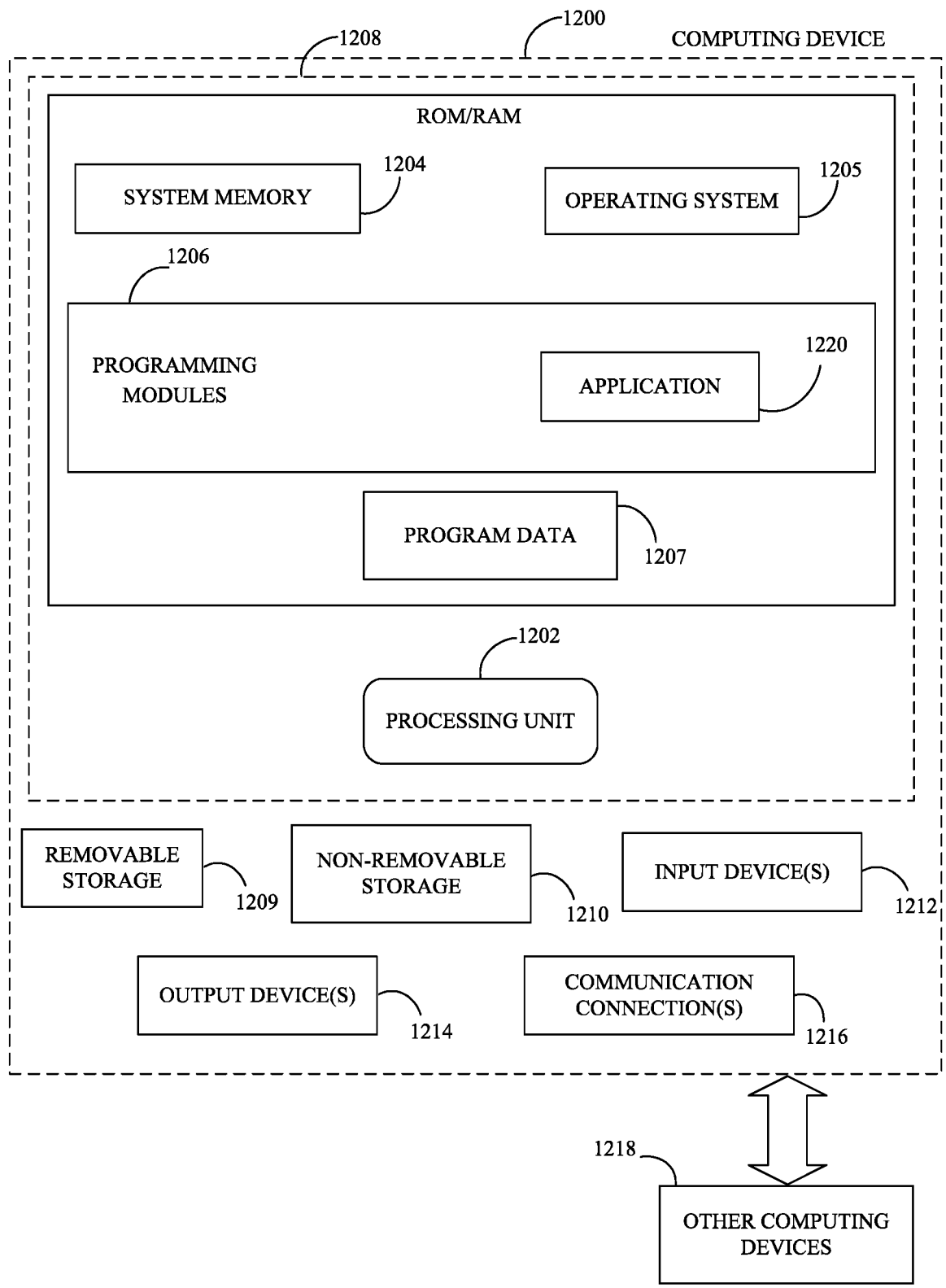
FIG. 12 illustrates an exemplary computing system that may be employed to implement processing functionality for various embodiments.

FIG. 12 is a block diagram of a system including computing device 1200. Consistent with an embodiment of the disclosure, the aforementioned memory storage and processing unit may be implemented in a computing device, such as computing device 1200 of FIG. 12. Any suitable combination of hardware, software, or firmware may be used to implement the memory storage and processing unit. For example, the memory storage and processing unit may be implemented with computing device 1200 or any of other computing devices 1218, in combination with computing device 1200. The aforementioned system, device, and processors are examples and other systems, devices, and processors may comprise the aforementioned memory storage and processing unit, consistent with embodiments of the disclosure.

With reference to FIG. 12, a system consistent with an embodiment of the disclosure may include a computing device or cloud service, such as computing device 1200. In a basic configuration, computing device 1200 may include at least one processing unit 1202 and a system memory 1204. Depending on the configuration and type of computing device, system memory 1204 may comprise, but is not limited to, volatile (e.g. random access memory (RAM)), non-volatile (e.g. read-only memory (ROM)), flash memory, or any combination. System memory 1204 may include operating system 1205, one or more programming modules 1206, and may include a program data 1207. Operating system 1205, for example, may be suitable for controlling computing device 1200's operation. In one embodiment, programming modules 1206 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and nonvolatile, removable and non-removable media implemented in any method or technology for storage of information, such as computer-readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, etc. Output device(s) 1214 such as a display, speakers, a printer, etc. may also be included. The aforementioned devices are examples and others may be used.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1204, including operating system 1205. While executing on processing unit 1202, programming modules 1206 (e.g., application 1220) may perform processes including, for example, one or more stages of methods 500, 600, 700, 800, 900, 1000 and 1100 as described above. The aforementioned process is an example, and processing unit 1202 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

I claim:

1. A method of facilitating management of at least one service agreement associated with a user account and at least one service provider, the method comprising:
   receiving, using a communication device, a service agreement from a service provider system;
   analyzing, using a processing device, the service agreement;
   identifying, using the processing device, at least one collectable data associated with the user account based on the analyzing;
   identifying, using the processing device, at least one action associated with the at least one collectable data based on the analyzing;
   storing, using a storage device, each of the at least one collectable data and the at least one action in association with the service agreement;
   transmitting, using the communication device, each of the at least one collectable data and the at least one action to a user device associated with the user account;
   determining, using the processing device, at least one of a privacy risk score and a restriction score associated with the service agreement based on the analyzing of the service agreement;
   wherein the restriction score is based on at least one optionality associated with the at least one action, wherein an optionality of an action allows a user associated with the user account to opt-out of the action;
   identifying, using the processing device, at least one optionality associated with the at least one collectable data and the at least one action, wherein an optionality associated with a collectable data allows a user associated with the user account to forbid access to the collectable data, wherein an optionality associated with an action allows the user to forbid performance of the action; and
   determining, using the processing device, a count associated with the at least one optionality, wherein the restriction score is based on the count.

2. The method of claim 1 further comprising:
   receiving, using the communication device, an indication of the service provider system from the user device;
   transmitting, using the communication device, a request to the service provider system; and receiving, using the communication device, a response from the service provider system, wherein the response comprises the service agreement.

3. The method of claim 2 further comprising:
receiving, using the communication device, browser data from the user device;
analyzing, using the processing device, the browser data; and
identifying, using the processing device, each of a service agreement indicator and a brand identifier based on the analysis of the browser data, wherein the indication of the service provider comprises the brand identifier and the service agreement indicator.

4. The method of claim 1 further comprising:
determining, using the processing device, a privacy risk score associated with the service agreement based on the analyzing of the service agreement;
comparing, using the processing device, the privacy risk score to a predetermined threshold; and
transmitting, using the communication device, an alert to the user device based on a result of the comparing.

5. The method of claim 1 further comprising:
generating, using the processing device, a preferences interface associated with the service agreement, wherein the preferences interface comprises at least one parameter corresponding to the at least one collectable data, wherein at least one value corresponding to the at least one parameter determines the at least one action performable on the at least one collectable data;
transmitting, using the communication device, the preferences interface to the user device;
receiving, using the communication device, the at least one value corresponding to the at least one parameter from the user device; and
transmitting, using the communication device, the at least one value to the service provider system.

6. The method of claim 1 further comprising:
identifying, using the processing device, at least one sensitive data in the at least one collectable data;
identifying, using the processing device, at least one sensitive action in the at least one action; and
determining, using the processing device, the privacy risk score based on at least one of the at least one sensitive data and the at least one sensitive action.

7. The method of claim 1 further comprising:
receiving, using the communication device, collected data from at least one of the user device and the service provider system;
comparing, using the processing device, the collected data with the at least one collectable data;
determining, using the processing device, a breach of the service agreement based on the comparing; and
transmitting, using the communication device, a breach-alert to at least one of the user device and the service provider system based on determining the breach.

8. A system for facilitating management of at least one service agreement associated with a user account and at least one service provider, the system comprising:
a communication device configured for:
receiving a service agreement from a service provider system; and
transmitting each of at least one collectable data and at least one action to a user device associated with the user account;
a processing device configured for:
analyzing the service agreement;
identifying the at least one collectable data associated with the user account based on the analyzing; and
identifying the at least one action associated with the at least one collectable data based on the analyzing; and
a storage device configured for storing each of the at least one collectable data and the at least one action in association with the service agreement;
wherein the processing device is further configured for determining at least one of a privacy risk score and a restriction score associated with the service agreement based on the analyzing of the service agreement;
wherein the restriction score is based on at least one optionality associated with the at least one action, wherein an optionality of an action allows a user associated with the user account to opt-out of the action;
wherein the processing device is further configured for:
identifying at least one optionality associated with the at least one collectable data and the at least one action, wherein an optionality associated with a collectable data allows a user associated with the user account to forbid access to the collectable data, wherein an optionality associated with an action allows the user to forbid performance of the action; and
determining a count associated with the at least one optionality, wherein the restriction score is based on the count.

9. The system of claim 8, wherein the communication device is further configured for:
receiving an indication of the service provider system from the user device;
transmitting a request to the service provider system; and
receiving a response from the service provider system, wherein the response comprises the service agreement.

10. The system of claim 9, wherein the communication device is further configured for:
receiving browser data from the user device;
analyzing the browser data; and
identifying each of a service agreement indicator and a brand identifier based on the analysis of the browser data, wherein the indication of the service provider comprises the brand identifier and the service agreement indicator.

11. The system of claim 8, wherein the processing device is further configured for:
determining a privacy risk score associated with the service agreement based on the analyzing of the service agreement;
comparing the privacy risk score to a predetermined threshold;
wherein the communication device is further configured for transmitting an alert to the user device based on a result of the comparing.

12. The system of claim 8, wherein the processing device is further configured for generating a preferences interface associated with the service agreement, wherein the preferences interface comprises at least one parameter corresponding to the at least one collectable data, wherein at least one value corresponding to the at least one parameter determines the at least one action performable on the at least one collectable data, wherein the communication device is further configured for:
transmitting the preferences interface to the user device;
receiving the at least one value corresponding to the at least one parameter from the user device; and transmitting the at least one value to the service provider system.

13. The system of claim 8, wherein the processing device is further configured for:
   identifying at least one sensitive data in the at least one collectable data;
   identifying at least one sensitive action in the at least one action; and
   determining the privacy risk score based on at least one of the at least one sensitive data and the at least one sensitive action.

14. The system of claim 8, wherein the communication device is further configured for:
   receiving collected data from at least one of the user device and the service provider system;
   transmitting a breach-alert to at least one of the user device and the service provider system based on determining a breach, wherein the processing device is configured for:
   comparing the collected data with the at least one collectable data; and
   determining the breach of the service agreement based on the comparing.

* * * * *